United States Patent
Gade et al.

(10) Patent No.: US 10,970,883 B2
(45) Date of Patent: Apr. 6, 2021

(54) AUGMENTED REALITY SYSTEM AND METHOD OF DISPLAYING AN AUGMENTED REALITY IMAGE

(71) Applicant: AUGMENTI AS, Trondheim (NO)

(72) Inventors: Kenneth Gade, Skedsmokorset (NO); Lars Inge Solhaug, Ranheim (NO)

(73) Assignee: AUGMENTI AS, Trondheim (NO)

( * ) Notice: Subject to any disclaimer, the term of this patent is extended or adjusted under 35 U.S.C. 154(b) by 0 days.

(21) Appl. No.: 16/624,298

(22) PCT Filed: Feb. 7, 2018

(86) PCT No.: PCT/EP2018/052985
§ 371 (c)(1),
(2) Date: Dec. 19, 2019

(87) PCT Pub. No.: WO2018/233881
PCT Pub. Date: Dec. 27, 2018

(65) Prior Publication Data
US 2020/0126265 A1   Apr. 23, 2020

(30) Foreign Application Priority Data
Jun. 20, 2017 (NO) .................................. 20171008

(51) Int. Cl.
*G06T 11/00* (2006.01)
*G06T 7/246* (2017.01)
(Continued)

(52) U.S. Cl.
CPC .............. *G06T 11/00* (2013.01); *G01S 19/42* (2013.01); *G06F 3/1454* (2013.01); *G06T 7/246* (2017.01);
(Continued)

(58) Field of Classification Search
CPC ....................................................... G06T 11/00
See application file for complete search history.

(56) References Cited

U.S. PATENT DOCUMENTS

| | | | |
|---|---|---|---|
| 7,046,214 | B2 | 5/2006 | Ebersole et al. |
| 2003/0210228 | A1 | 11/2003 | Ebersole et al. |

(Continued)

FOREIGN PATENT DOCUMENTS

| | | |
|---|---|---|
| GB | 2477787 A | 8/2011 |
| WO | 2003/060830 A1 | 7/2003 |

(Continued)

OTHER PUBLICATIONS

International Search Report and Written Opinion dated Jun. 5, 2018 for PCT/EP2018/052985 filed on Oct. 30, 2017, 13 pages.

(Continued)

*Primary Examiner* — Jitesh Patel
(74) *Attorney, Agent, or Firm* — Xsensus LLP

(57) ABSTRACT

An augmented reality system includes a global navigation satellite system module adapted to output position data, an orientation measurement module adapted to output orientation data, an augmented reality module, at least one AR-client having a camera and a display. The augmented reality module is adapted to determine a position and orientation of the camera of the at least one AR-client based on the position data and orientation data, calculating screen positions of at least one AR object based on the position and orientation of the camera of the at least one AR-client to create at least one AR-overlay, transmitting the at least one AR overlay to at least one AR-client, and the AR-client is adapted to merging the at least one AR-overlay with a picture received from the camera of the at least one AR-client to provide an AR-image, and displaying the AR-image on the display.

12 Claims, 4 Drawing Sheets

(51) Int. Cl.
*G01S 19/42* (2010.01)
*G09G 5/38* (2006.01)
*H04N 5/247* (2006.01)
*G06F 3/14* (2006.01)

(52) U.S. Cl.
CPC ............... *G09G 5/38* (2013.01); *H04N 5/247* (2013.01); *G06T 2207/10016* (2013.01); *G06T 2207/30212* (2013.01); *G09G 2340/125* (2013.01)

(56) References Cited

U.S. PATENT DOCUMENTS

| | | | |
|---|---|---|---|
| 2004/0066391 A1 | 4/2004 | Daily et al. | |
| 2011/0102459 A1* | 5/2011 | Hall | H04W 4/021 345/633 |
| 2011/0115816 A1 | 5/2011 | Brackney | |
| 2011/0216002 A1 | 9/2011 | Weising et al. | |
| 2012/0158287 A1* | 6/2012 | Altamura | G01C 21/3602 701/412 |
| 2013/0194304 A1* | 8/2013 | Latta | G09G 3/003 345/633 |
| 2013/0257907 A1* | 10/2013 | Matsui | G06F 3/011 345/633 |
| 2015/0302665 A1* | 10/2015 | Miller | G06F 3/16 345/419 |
| 2016/0048203 A1 | 2/2016 | Blum | |
| 2016/0132046 A1 | 5/2016 | Beoughter et al. | |
| 2016/0133230 A1* | 5/2016 | Daniels | G06F 3/147 345/633 |

FOREIGN PATENT DOCUMENTS

| | | |
|---|---|---|
| WO | 2009/138069 A1 | 11/2009 |
| WO | 2017/020132 A1 | 2/2017 |

OTHER PUBLICATIONS

"Camera supported inertial navigation system," Fraunhofer-Institute for Manufacturing Engineering and Automation IPA, 2 pages.
Grade, K., "The Seven Ways to Find Heading," The Journal of Navigation, vol. 69, Apr. 4, 2016, pp. 955-970.
Solhaug, L., I., and Ostevold, E., "Augmented Reality for Improved Situational Awareness in Combat Vehicles," The Long-Term Aspects of the Nato Defence Planning Process-Target L 3108 C, STO-MP-AVT-256, pp. 2-1 to 2-14.
International-Type Search Report for Norwegian Patent Application No. 20171008, 4 pages.
Office Action dated Nov. 21, 2017 for Norwegian Patent Application No. 20171008, 6 pages.
Opposition to Norwegian Patent No. 342793, dated May 6, 2019, 61 pages (with partial English translation).
AR og BMS—Bedret situasjonsforstaelse—Augmenti AS, Artikkel på siden til Augmenti: AR og BMS—Bedret situasjonsforståelse, URL: https://www.augmenti.no/archives/546, 2 pages (cited in Opposition to Norwegian Patent No. 342793 provided with partial English translation).
Norsk militmr nmrmer sig augmented reality I bevmbnede keretejer, Artikkel om AR i militmret, URL: https://ing.dk/artikel/norsk-militaer-naermer-sigaugmented-reality-i-bevaebnede-koeretoejer-177075, 1 page (cited in Opposition to Norwegian Patent No. 342793 provided with partial English translation).
Slik vil siktet for en norsk stridsvogn-skytter snart se ut, Artikkel om Augmenti og AWARE i Teknisk Ukeblad fra 24. juni 2015, URL: https://www.tu.no/artikler/slik-vil-siktet-for-en-norsk-stridsvogn-skytter-snart-se-ut/223776, pp. 1-8 (cited in Opposition to Norwegian Patent No. 342793 provided with partial English translation).
Tekst samt tre videoer tilgjengelig på nettsidene til FFI siden 2015, URL: http://www2.ffi.no/aware, 5 pages (cited in Opposition to Norwegian Patent No. 342793 provided with partial English translation).
Viten, Forskningsfaglig Rapport 2.2016 Forsvarets Forskningsinstitutt, Rapport med blantannet bruk av AR, URL: https://www.th.no/no/Rapporter/16-01028.pdf, 48 pages (cited in Opposition to Norwegian Patent No. 342793 provided with partial English translation).
Brookshire, J., Oskiper, T., Branzoi, V., Samarasekera, S., Kumar, R., Cullen, S., & Schaffer, R. (2015), Military Vehicle Training with Augmented Reality, Interservice/Industry Training, Simulation, and Education Conference (I/ITSEC15).

* cited by examiner

AUGMENTED REALITY SYSTEM AND METHOD OF DISPLAYING AN AUGMENTED REALITY IMAGE

CROSS-REFERENCE TO RELATED APPLICATIONS

The present application is based on PCT filing PCT/EP2018/052985, filed Feb. 7, 2018, which claims priority to NO 20171008, filed Jun. 20, 2017, the entire contents of each are incorporated herein by reference.

FIELD OF THE INVENTION

The invention relates to augmented reality systems and methods of displaying an augmented reality image.

BACKGROUND OF THE INVENTION

Augmented Reality (AR), also known as Mixed Reality, augments what a user sees by superimposing virtual information on the real world view as seen from the user. AR is used to place virtual objects that are geo-positioned in the real world into the view of a user such that the user sees the augmented virtual object where it belongs in the real world. That is, when the user for instance looks at a real person with a known position, a virtual object representing that person should be seen by the user as positioned aligned to that person, even when both the user and the person moves around.

To place virtual objects with high precision require accurate measurements of the direction of the user's view. Current AR-systems having high directional accuracy are dependent of an external navigational unit and a separate computer that runs the AR-software. The use of two units increases the size, complexity, and cost.

Many technologies exist that may provide a direction, for example magnetic compass, gyro compass, and combining several Global Navigation Satellite System (GNSS) antennas. The direction given by a magnetic compass is influenced by global and local magnetic fields and it cannot be used to place AR-symbols with sufficient accuracy and reliability. There are many sources of magnetic disturbances, e.g. natural and man-made magnetic material in the surroundings and electromagnetic interference from the equipment (for instance a vehicle) that the compass is attached to. A gyro compass finds true north with good accuracy without being affected by magnetic fields. Its disadvantages are size, weight, cost, and start up time of finding initial heading. The gyro compass also has a reduced heading accuracy when far north or south (since the horizontal component of the earth rotation vector is becoming short at high latitudes).

Combining the output from several GNSS antennas can be used to give the direction with good accuracy. This requires a necessary distance between the antennas which makes it unsuitable for a large number of AR-solutions.

Current units that produce high accuracy direction are based on gyro compasses, and are too big, too costly, and draw too much power, to be used in anything but high cost solutions. Current low cost systems struggle to achieve sufficient accuracy in estimating the heading. For example, mobile phones are often equipped with both a GNSS solution and a digital magnetic compass. Solutions with AR-software running on these phones depending on the digital magnetic compass for direction are not able to place their AR-symbols with required accuracy due to the error in the direction.

Current AR-systems have a direct connection between the computational unit and the display unit (independently if this is using see-through or video-see-through or other means of displaying the AR-content). That is, the display unit is connected with a cable as when using a desktop computer with a monitor or the display is built-in as in a tablet.

Current AR-systems will normally produce AR-images for one particular configuration for one particular kind of user, e.g. a user of a HMD unit. This image may in some cases be shared with others, but it is then the same AR-image that all the users will see.

GB2477787 disclose a portable electronic device comprising a first input for receiving a first image signal from a camera of a head-mounted display (HMD) device, a second input for receiving a position signal from a position sensor in proximity to the portable electronic device, and a third input for receiving a first orientation signal from an orientation sensor of the HMD device; a processor for running an augmented reality (AR) application to generate a data overlay of the first image signal based on the position signal and the first orientation signal and transmit the data overlay 32 to a display of the head-mounted display device.

The invention provides high precision placement of AR-symbols by combining a high precision directional unit and AR-software that feeds one or several distributed AR-clients with AR-overlays in one compact common unit.

BRIEF SUMMARY OF THE INVENTION

According to a first aspect of the embodiments herein it is provided an augmented reality system, comprising a global navigation satellite system module adapted to output position data, an orientation measurement module adapted to output orientation data, an augmented reality module, at least one AR-client comprising a camera and a display, wherein the augmented reality module is adapted to determine a position and orientation of the camera of the at least one AR-client based on the position data and orientation data, calculating screen positions of at least one AR object based on the position and orientation of the camera of the at least one AR-client to create at least one AR-overlay, transmitting the at least one AR overlay to at least one AR-client, and the AR-client is adapted to merging the at least one AR-overlay with a picture received from the camera of the at least one AR-client to provide an AR-image, and displaying the AR-image on the display.

According to a second aspect of the embodiments herein it is provided a method of displaying an augmented reality image, comprising determining a position of an augmented reality device by a global navigation satellite system, measuring an orientation of the augmented reality device by an orientation measurement module, determining, based on the position and orientation of the augmented reality device, the position and orientation of at least one camera, calculating screen positions of at least one AR object based on the position and orientation of the at least one camera to create at least one AR-overlay, transmitting the at least one AR overlay to at least one AR-client remote from the augmented reality device, merging, by the at least one AR-client, the at least one AR-overlay with a picture received from the at least one camera to provide an AR-image, and displaying the AR-image to a user of the at least one AR-client.

FIGURES

DETAILED DESCRIPTION OF THE INVENTION

It should be noted that the following embodiments are not mutually exclusive. Components from one embodiment may be tacitly assumed to be present in another embodiment and it will be obvious to a person skilled in the art how those components may be used in the other exemplary embodiments.

Figure 1:
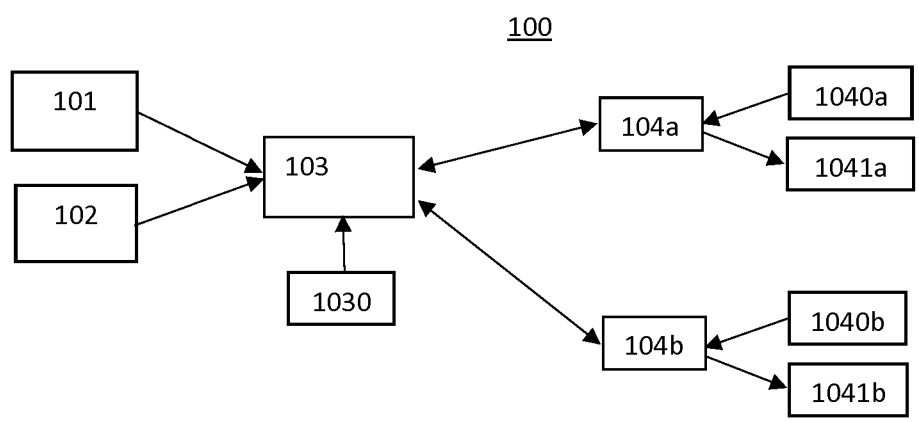
FIG. 1 is a schematic block diagram illustrating embodiments of an augmented reality system.

FIG. 1 illustrates an embodiment of an augmented reality (AR) system 100. The AR-system comprises a global navigation satellite system module 101, an orientation measurement module 102, an augmented reality module 103, and at least one AR-client 104a, 104b.

The at least one AR-client 104a, 104b comprises a camera 1040a, 1040b and a display 1041a, 1041b. The display 1041a, 1041b may be any kind of a display suitable for displaying an image to a user, such as a head-mounted display (HMD), and optical head mounted display, head-up display (HUD) or any kind of computer display. The computer display may be based on CRT, LCD, LCos, OLED and any other display technology. The camera 1040a, 1040b may be any kind of camera suitable for capturing images of the real world. The camera 1040a, 1040b may comprise both a night time camera and a day time camera.

The global navigation satellite system (GNSS) module 101 is adapted to output position data of a carrier of the AR-system 100 to the at least on AR-client 104a, 104b. The GNSS module 101 may be any kind of navigational satellite system such as Global Positioning System (GPS) or Globalnaja navigatsionnaja sputnikovaja Sistema (GLONASS). The carrier of the AR-system 100 may be a person, a land vehicle, a watercraft or aircraft.

The orientation measurement module 102 is adapted to output orientation data of the carrier of the AR-system 101 to the at least on AR-client 104a, 104b. The orientation data may be provided by an inertial measurement unit (IMU) that measures linear acceleration and rotational rate of the carrier. The IMU usually contains three gyros and three accelerometers. The IMU of the present invention may be a MEMS-(Microelectromechanical systems) device. MEMS-devices may be provided at low cost.

The augmented reality module 103 is adapted to determine a position and orientation of the camera 1040a, 1040b of the at least one AR-client 104a, 104b based on the position data received from the GNSS-module 101 and orientation data received from the orientation measurement module 102. The augmented reality module 103 may be preconfigured with the position of the and orientation of the camera 1040a, 1040b relative to the GNSS-module 101 and the orientation measurement module 102 in order to determine the position and orientation of the camera 1040a, 1040b. Also referring to FIG. 2, The AR-module 103 is then calculating screen positions of at least one AR object 201a, 201b based on the position and orientation of the camera of the at least one AR-client 104a, 104b to create at least one AR-overlay 200. The AR object 201a, 201b may be provided from an application specific information provider such as a battle management system or an architectural application. After the AR-module 103 has created the at least one AR-overlay 200, the AR-module 103 is transmitting the at least one AR overlay 200 to at least one AR-client 104a, 104b. The AR-module 103 may be implemented in a computer having a processor, a memory and wireless and/or wired communication modules.

The at least one AR-client 104a, 104b is adapted to merging the at least one AR-overlay 200 with a picture 203 received from the camera 1040a, 1040b of the at least one AR-client 104a, 104b to provide an AR-image 204, and displaying the AR-image 204 on the display 1041a, 1041b. The AR-client 104a, 104b may be a remote weapon station, a mounted binocular, an operating room of a land vehicle, a watercraft or aircraft etc.

The at least one AR-client 104a, 104b may also be adapted to merging the at least one AR-overlay 200 with a picture received from the camera of another AR-client. E.g. a picture of camera 1040a may be displayed with the AR-overlay 200 on display 1041b. In an alternative embodiment, the AR-module 103 may comprise a camera 1030, in the following the AR-module camera 1030. The AR-module camera 1030 may be any kind of camera suitable for capturing images of the real world. AR-module camera 1030 may comprise both a night time camera and a day time camera. The picture received from the AR-module camera 1030 may be transmitted to the AR-clients 104a, 104b with the AR-overlay 200 to be merged with the AR-client 104a, 104b and displayed on the display 1041a, 1041b.

The AR-overlay 200 may be, and not limited to the following alternatives, in the form of an image with transparent background, data that tells how the AR-overlay shall be rebuilt by the AR-client, finished AR-image built by merging AR-symbols on top of the pictures from the AR-module camera, or finished AR-image built by merging AR-symbols on top of an image received by the AR-software from the AR-client (or any other available image source).

When the augmented reality module 103 further comprises an AR-module camera 1030, the augmented reality module may be adapted to adjusting, based on the position data and orientation data a heading of the camera of the at least one AR-client by identifying earth fixed features captured by the camera of the augmented reality module 1030, tracking movement of the earth fixed features and adjusting the heading of the camera of the at least one AR-client by compensating for the movement of the earth fixed features.

Figure 2:
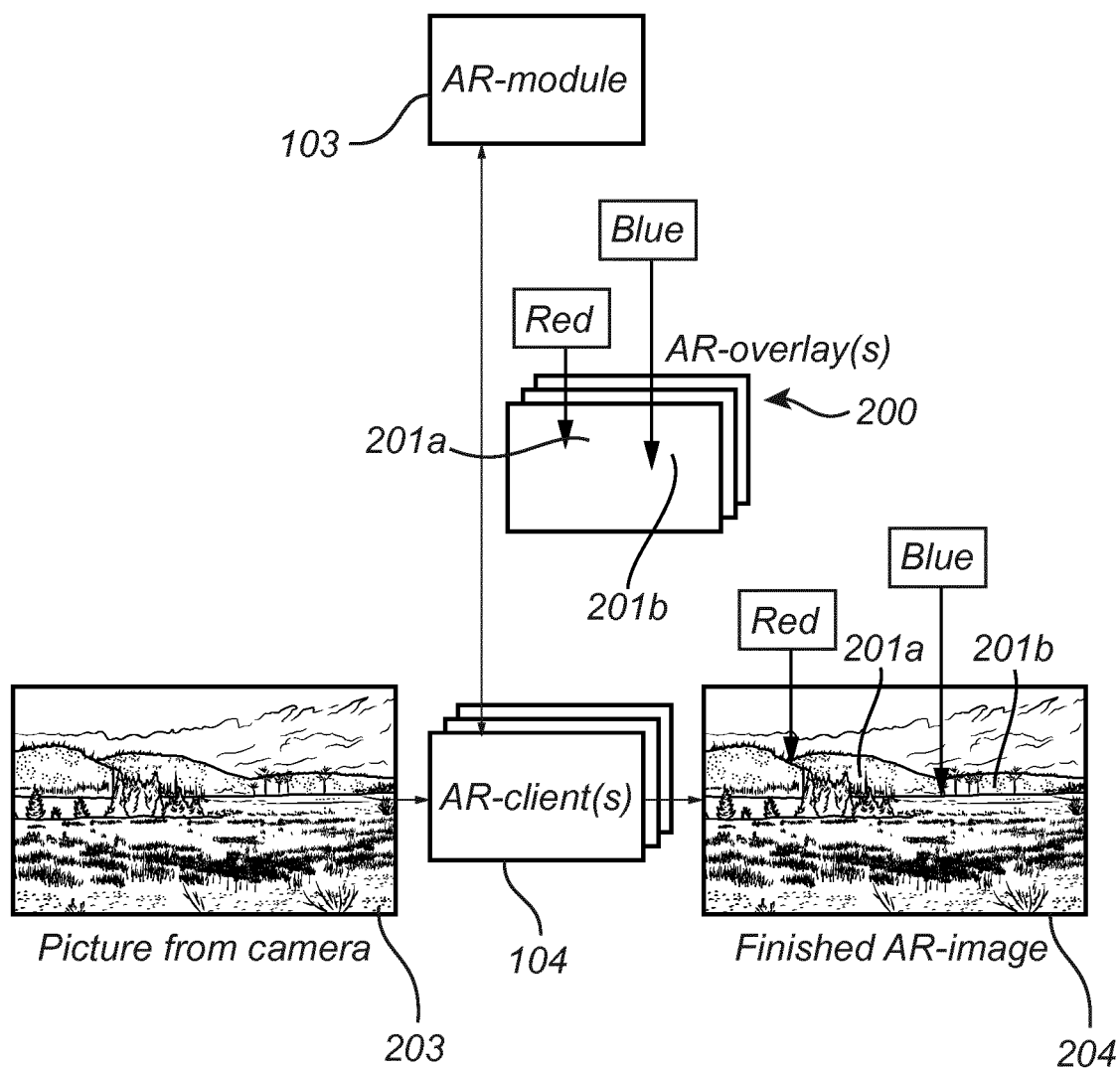
FIG. 2 is a schematic block diagram illustrating embodiments of displaying an AR-image.
Figure 3:
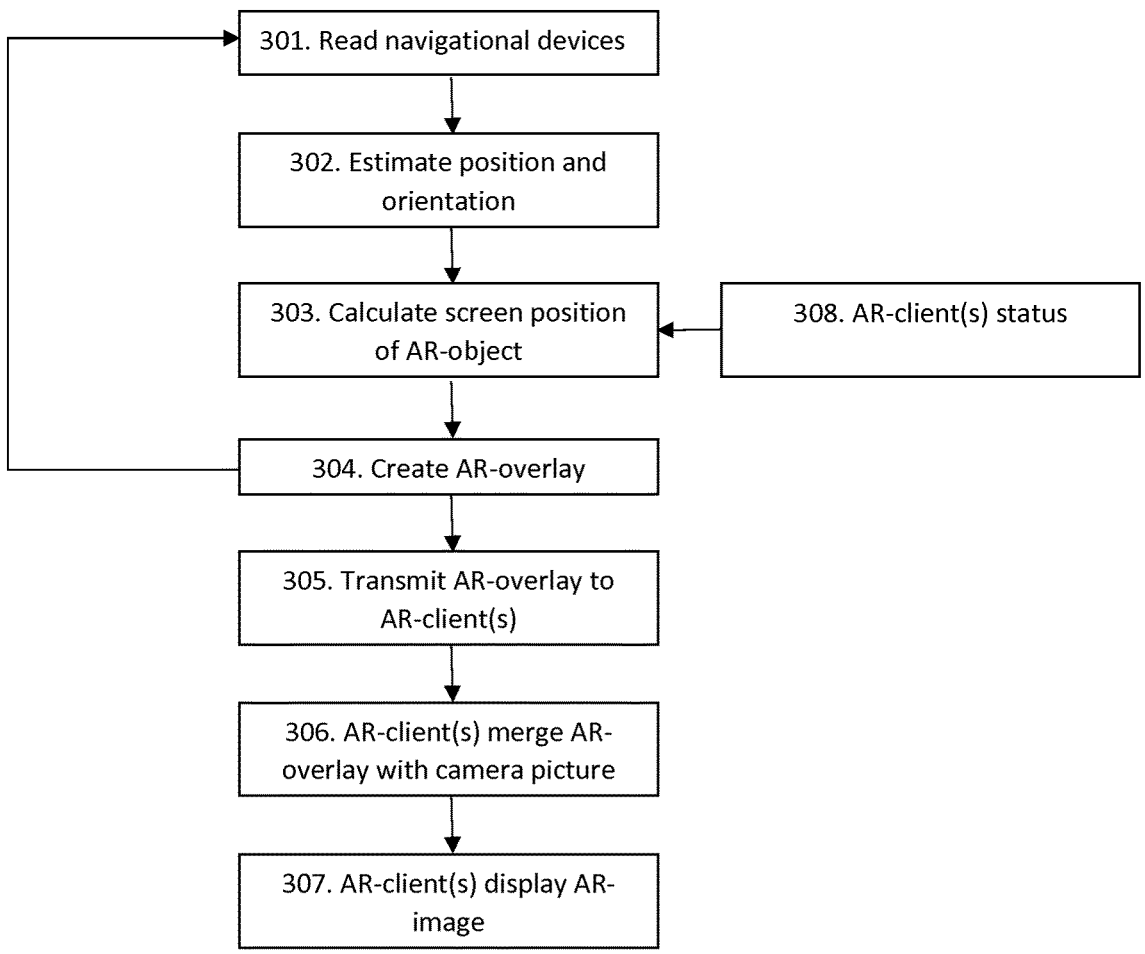
FIG. 3 is a flowchart depicting embodiments of a method performed by an augmented reality system.

Embodiments of a method of displaying an augmented reality image will now be described with reference to FIG. 3 and with continued reference to FIGS. 1 and 2.

In step 301 navigational devices are read to find a position and orientation of an augmented reality device.

Figure 4:
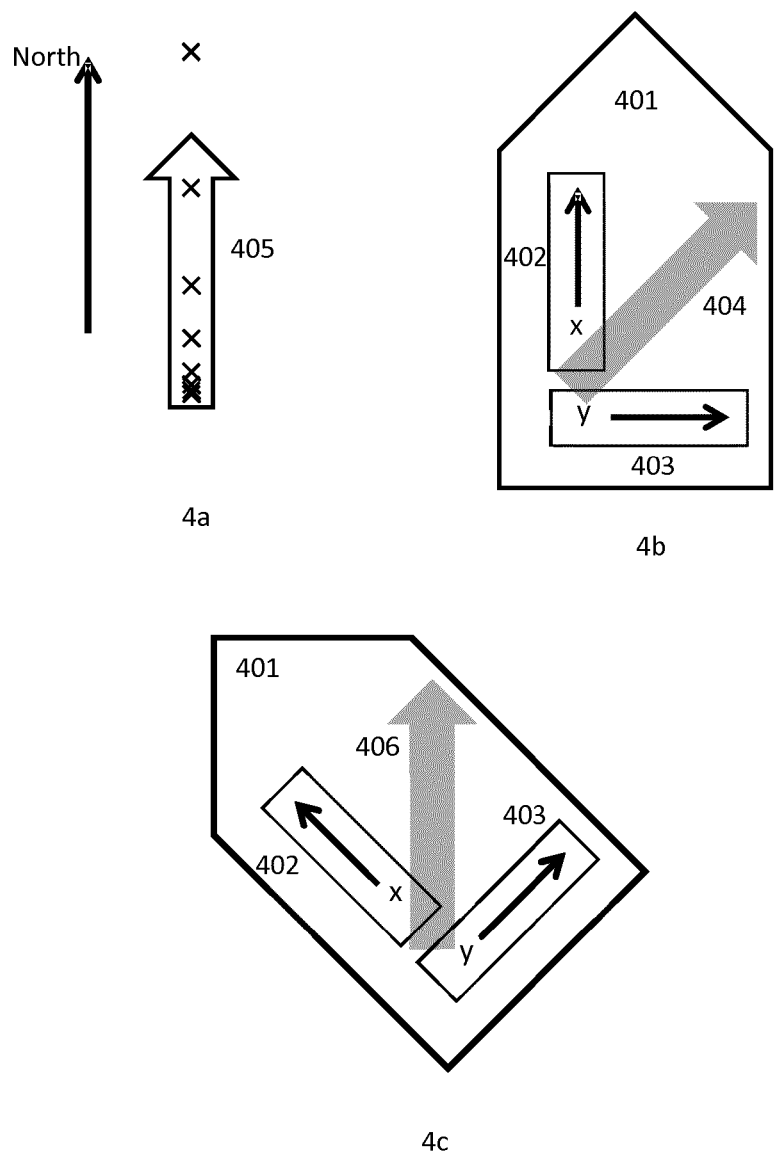
FIG. 4 is a schematic diagram illustrating a method to estimate heading/azimuth.

The method comprises the steps of determining a position of an augmented reality device 103 by a global navigation satellite system and measuring an orientation of the augmented reality device by an orientation measurement module. In one embodiment, the method comprises determining the heading of the augmented reality device 103 by calculating change in position of the augmented reality device 103 to determine a first horizontal acceleration vector relative to north, calculating change in orientation of the augmented reality device to 103 determine a second horizontal acceleration vector, and determining the heading of the augmented reality device 103 by comparing the first horizontal acceleration vector with the second horizontal acceleration vector. An example is shown in FIG. 4a-4c where the method utilizes a GNSS receiver 101 (e.g. Global Positioning System (GPS)) and an inertial measurement unit 102 (IMU, containing three gyros and three accelerometers). The position is found by the GNSS. The roll and pitch are found by utilizing the direction of the gravity vector output from the IMU. The heading/azimuth may be estimated by utilizing the acceleration of the augmented reality device when in movement. The direction of the acceleration relative to the north can be found from the GNSS measurements. FIG. 4a shows the acceleration is in the north direction as measured by the GNSS. FIG. 4b shows a 2D example of how heading may be found from the acceleration. In real life the direction of the acceleration vector relative to the augmented reality device is measured by three accelerometers of the IMU measuring the direction and magnitude of the acceleration in 3D. When the same vector is known both relative to north and relative to the augmented reality device, the heading may be found. FIG. 4b shows a general vehicle 401 in grey. Two accelerometers 402, 403 are attached to the vehicle 401, and accelerometer x 402 points in the vehicle forward direction, while accelerometer y 403 points to vehicle starboard. A horizontal acceleration is present, and for simplicity of the example both accelerometers measure the same value. Hence, the acceleration must point in a direction 45° relative to the vehicle, shown by the arrow 404. The same acceleration is visible in the GNSS measurements of FIG. 4a, shown by arrow 405. When the two arrows 404 and 405 is overlaid 406 as shown in FIG. 4c it is clear that the heading of the vehicle 401 is north-west.

In step 302, the method is determining, based on the position and orientation of the augmented reality device 103, the position and orientation of at least one camera 1030, 1040a, 1040b. The camera may be any kind of camera suitable for capturing images of the real world, where the position and orientation of the camera relative to the augmented reality device is known. The camera may in exemplary embodiments be part of an AR-client 104a, 104b and/or part of the augmented reality device 103. The camera may comprise both a night time camera and a day time camera.

In step 303, the method is calculating screen positions of at least one AR object 201a, 201b based on the position and orientation of the at least one camera to in step 304 create at least one AR-overlay 200. The step of calculating screen positions of the at least one AR object 201a, 201b to create at least one AR-overlay 200 may also take into consideration a state of the AR-client 104a, 104b obtained in step 308, such as day time camera, night time camera, camera field of view, amount camera zoom. The AR object 201a, 201b may be provided from an application specific information provider such as a battle management system or an architectural application depending on the configuration. The augmented reality device 103 may also calculate screen positions of the at least one AR object 201a, 201b based on the position and orientation of at least two cameras 1030, 1040a, 1040b to create a first AR-overlay based on the position and orientation of the first camera (e.g. 1030), and a second AR-overlay based on the position of the second camera (e.g. 1040a).

In one embodiment, the first AR-overlay and the second AR-overlay contains the same at least one AR object (e.g. 201a). In another embodiment, the first AR-overlay contains at least one AR object different from the second AR-overlay, e.g. the first AR-overlay may contain AR object 201a while the second AR-overlay contains AR object 201b. This allows producing completely independent AR-overlays to different AR-clients where independent inputs from AR-clients where the AR-clients may have their own cameras and where the directions of these cameras are inferred from the direction of the invention are utilised. Cameras of a weapon station, cameras mounted on a turret, and 360 degrees' cameras would normally have well known positions relative to the augmented reality device such that the augmented reality device may calculate the direction of these cameras to provide AR-overlays to them. When the at least one AR-overlay 200 has been created, then in step 305, the method is transmitting the at least one AR overlay 200 to at least one AR-client 104a, 104b remote from the augmented reality device 103.

In step 306, the method is merging, by the at least one AR-client 104a, 104b, the at least one AR-overlay 200 with a picture received from the at least one camera 1030, 1040a, 1040b to provide an AR-image, and in step 307 displaying the AR-image to a user of the at least one AR-client 104a, 104b. The AR-image may be displayed to a user using any kind of a display 1041a, 1041b suitable for displaying an image to the user, such as a head-mounted display (HMD), and optical head mounted display, head-up display (HUD) or any kind of computer display. In one embodiment, a first AR-client merges the first AR-overlay with a picture received from the first camera to provide a first AR-image, and a second AR-client merges the second AR-overlay with a picture received from the second camera to provide a second AR-image.

Figure 5:
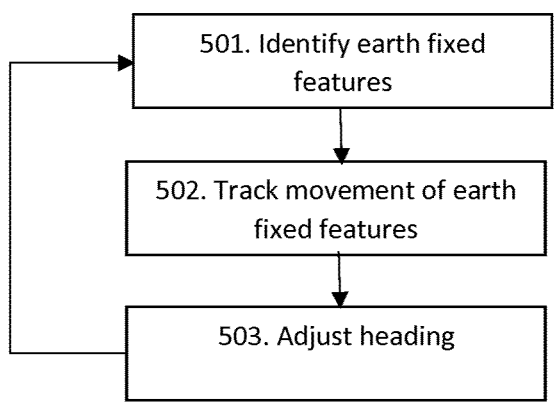
FIG. 5 is a flowchart depicting embodiments of adjusting heading.

When the AR-device 103 is stationary the estimate of the heading may drift, in particular, when using small, low cost IMUs 102. To position the AR objects 201a, 201b with the required accuracy it is necessary to adjust for this drift. In one embodiment, when the AR device 103 is provided with an AR-module camera 1030 then, with reference to FIG. 5, in step 302 the method further comprises adjusting the heading of the augmented reality device 103 by in step 501 identifying earth fixed features captured by the AR-module camera 1030 of the augmented reality device 103, in step 502 tracking movement of the earth fixed features, and in step 503 adjusting the heading of the augmented reality device 103 by compensating for the movement of the earth fixed features. The identification and tracking of earth fixed features may be performed with any suitable video tracking software.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Also note that terminology such as a first computer and a second computer should be considered to be non-limiting and does in particular not imply a certain hierarchical relation between the two.

The invention claimed is:
1. An augmented reality (AR) system, comprising:
 a global navigation satellite system module adapted to output position data;

an orientation measurement module adapted to output orientation data;

an augmented reality module; and at least one AR-client comprising a camera and a display, wherein the augmented reality module is adapted to determine a position and an orientation of the camera of the at least one AR-client based on the position data and orientation data, calculate screen positions of at least one AR object based on the position and the orientation of the camera of the at least one AR-client to create at least one AR-overlay, transmit the at least one AR-overlay to at least one AR-client, the at least one AR-client is adapted to:

merge the at least one AR-overlay with a picture received from the camera of the at least one AR-client to provide an AR-image, and display the AR-image on the display, the augmented reality module further comprises another camera, and the augmented reality module is further adapted to adjust, based on the position data and orientation data, a heading of the camera of the at least one AR-client by:

identifying earth fixed features captured by the another camera of the augmented reality module, tracking movement of the earth fixed features, and adjusting the heading of the camera of the at least one AR-client by compensating for the movement of the earth fixed features.

2. The augmented reality system according to claim 1, wherein the orientation measurement module comprises an inertial measurement unit.

3. The augmented reality system according to claim 2, wherein the inertial measurement unit is a MEMS-device.

4. The augmented reality system according to claim 1, wherein the camera of the at least one AR-client and/or the another camera of the augmented reality module comprises at least a night time camera and a daytime camera.

5. A method of displaying an augmented reality (AR) image, comprising:

determining a position of an augmented reality device by a global navigation satellite system;

measuring an orientation of the augmented reality device by an orientation measurement module;

determining, based on the position and orientation of the augmented reality device, the position and orientation of at least one camera;

calculating screen positions of at least one AR object based on the position and orientation of the at least one camera to create at least one AR-overlay;

transmitting the at least one AR-overlay to at least one AR-client remote from the augmented reality device;

merging, by the at least one AR-client, the at least one AR-overlay with a picture received from the at least one camera to provide an AR-image; and displaying the AR-image to users of the at least one AR-client, wherein the determining, based on the position and orientation of the augmented reality device, the position and orientation of the at least one camera, comprises determining the heading of the augmented reality device by:

calculating change in position of the augmented reality device to determine a first horizontal acceleration vector relative to north, calculating change in orientation of the augmented reality device to determine a second horizontal acceleration vector, and determining the heading of the augmented reality device by comparing the first horizontal acceleration vector with the second horizontal acceleration vector.

6. The method according to claim 5, further comprises calculating screen positions of the at least one AR object based on the position and orientation of at least two cameras to create a first AR-overlay based on the position and orientation of a first camera of the at least two cameras, and a second AR-overlay based on the position of a second camera of the at least two cameras.

7. The method according to claim 6, wherein a first AR-client of the at least one AR-client merges the first AR-overlay with a picture received from the first camera to provide a first AR-image, and a second AR-client at least one AR-client merges the second AR-overlay with a picture received from the second camera to provide a second AR-image.

8. The method according to claim 6, wherein the first AR-overlay and the second AR-overlay contains the same at least one AR object.

9. The method according to claim 6, wherein the first AR-overlay contains at least one AR object different from that contained in the second AR-overlay.

10. The method according to claim 5, wherein the at least one AR-object is received from an information provider.

11. The method according to claim 10, wherein the information provider is a battlefield management system.

12. A method of displaying an augmented reality (AR) image, comprising:

determining a position of an augmented reality device by a global navigation satellite system;

measuring an orientation of the augmented reality device by an orientation measurement module;

determining, based on the position and orientation of the augmented reality device, the position and orientation of at least one camera;

calculating screen positions of at least one AR object based on the position and orientation of the at least one camera to create at least one AR-overlay;

transmitting the at least one AR-overlay to at least one AR-client remote from the augmented reality device;

merging, by the at least one AR-client, the at least one AR-overlay with a picture received from the at least one camera to provide an AR-image; and displaying the AR-image to users of the at least one AR-client, wherein the determining, based on the position and orientation of the augmented reality device, the position and orientation of at least one camera, comprises adjusting the heading of the augmented reality device by:

identifying earth fixed features captured by a camera of the augmented reality device, tracking movement of the earth fixed features, and adjusting the heading of the augmented reality device by compensating for the movement of the earth fixed features.

* * * * *